(12) United States Patent
Okuno et al.

(10) Patent No.: US 10,317,011 B2
(45) Date of Patent: Jun. 11, 2019

(54) HYDROGEN STATION

(71) Applicant: Kobe Steel, Ltd., Hyogo (JP)

(72) Inventors: Takashi Okuno, Takasago (JP); Hitoshi Takagi, Takasago (JP); Kenji Nagura, Takasago (JP); Daisuke Wada, Takasago (JP); Takuro Uba, Takasago (JP); Akitoshi Fujisawa, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 160 days.

(21) Appl. No.: 15/520,379

(22) PCT Filed: Sep. 16, 2015

(86) PCT No.: PCT/JP2015/076324
§ 371 (c)(1),
(2) Date: Apr. 19, 2017

(87) PCT Pub. No.: WO2016/067780
PCT Pub. Date: May 6, 2016

(65) Prior Publication Data
US 2017/0328519 A1 Nov. 16, 2017

(30) Foreign Application Priority Data

Oct. 31, 2014 (JP) .................................. 2014-222414
Apr. 9, 2015 (JP) .................................. 2015-080057

(51) Int. Cl.
*F17C 5/06* (2006.01)
*F17C 5/00* (2006.01)

(52) U.S. Cl.
CPC ................ *F17C 5/06* (2013.01); *F17C 5/007* (2013.01); *F17C 2221/012* (2013.01);
(Continued)

(58) Field of Classification Search
CPC ...... F17C 5/06; F17C 5/007; F17C 2221/012; F17C 2223/0123; F17C 2223/035;
(Continued)

(56) References Cited

U.S. PATENT DOCUMENTS 4,531,558 A * 7/1985 Engel ............... B60K 15/03006
123/525
6,810,925 B2 * 11/2004 Graham .................... B60S 5/02
141/18
(Continued)

FOREIGN PATENT DOCUMENTS

EP 3217064 A1 * 9/2017 ............. F17C 5/007
JP 2004-017701 A 1/2004
(Continued)

OTHER PUBLICATIONS

Notification of Transmittal of Translation of the International Preliminary Report on Patentability (Chapter I) and Translation of Written Opinion of the International Searching Authority; PCT/JP2015/076324; dated May 11, 2017.
(Continued)

*Primary Examiner* — Timothy L Maust
(74) *Attorney, Agent, or Firm* — Studebaker & Brackett PC

(57) ABSTRACT

[Object] To enable a gas supply system to be easily transported and to increase a degree of freedom when the gas supply system is installed.
[Solution] A hydrogen station includes: a filling facility for filling a tank-mounted device with a gas; and a gas supply system for supplying the gas to the filling facility. The gas supply system includes: a compressor for compressing the gas; a compressor accommodating body for accommodating the compressor; a refrigerator for cooling the gas flowed into the filling facility or the gas just before being flowed into the filling facility, the refrigerator including an evaporation part,
(Continued)

an expansion part, and a compression part; and a cooler accommodating body for accommodating the evaporation part, the expansion part, and the compression part. The compressor accommodating body and the cooler accommodating body are detachable from each other.

10 Claims, 8 Drawing Sheets

(52) U.S. Cl.
CPC .......................... *F17C 2223/0123* (2013.01); *F17C 2223/035* (2013.01); *F17C 2225/0123* (2013.01); *F17C 2225/036* (2013.01); *F17C 2227/0157* (2013.01); *F17C 2227/0355* (2013.01); *F17C 2227/0358* (2013.01); *F17C 2250/01* (2013.01); *F17C 2250/0626* (2013.01); *F17C 2265/065* (2013.01); *F17C 2270/0139* (2013.01); *F17C 2270/0581* (2013.01); *Y02E 60/321* (2013.01); *Y02P 90/45* (2015.11)

(58) Field of Classification Search
CPC ........ F17C 2225/0123; F17C 2225/036; F17C 2227/0157; F17C 2227/0355; F17C 2227/0358; F17C 2250/01; F17C 2250/0626

USPC ........................................................ 141/82
See application file for complete search history.

(56) References Cited

U.S. PATENT DOCUMENTS

| 7,938,150 | B2* | 5/2011 | Handa | F17C 5/007 |
| | | | | 141/285 |
| 8,176,931 | B1 | 5/2012 | Cajiga et al. | |
| 2016/0348840 | A1* | 12/2016 | Nagura | F17C 7/00 |
| 2018/0038550 | A1* | 2/2018 | Kondo | F17C 5/06 |
| 2018/0306381 | A1* | 10/2018 | Fujisawa | F17C 5/06 |

FOREIGN PATENT DOCUMENTS

| JP | 2005-024061 A | 1/2005 |
| JP | 2009-236270 A | 10/2009 |
| JP | 2013-024287 A | 2/2013 |
| JP | 2013-167288 A | 8/2013 |
| JP | 2014-524865 A | 9/2014 |
| JP | 2015-158213 A | 9/2015 |

OTHER PUBLICATIONS

International Search Report issued in PCT/JP2015/076324; dated Dec. 22, 2015.

* cited by examiner

HYDROGEN STATION

TECHNICAL FIELD

The present invention relates to a hydrogen station.

BACKGROUND ART

In recent years, a vehicle utilizing a hydrogen gas, such as a fuel cell vehicle or a hydrogen vehicle, (hereinafter, simply referred to as a "vehicle") has been developed. Accordingly, a hydrogen station for filling a tank of the vehicle with the hydrogen gas has also been developed. For example, Patent Literature 1 discloses a mobile hydrogen station provided with a hydrogen producing device and a truck that is movable in a state in which the hydrogen producing device is loaded. This hydrogen station includes a compressor for compressing a hydrogen gas, a pressure accumulator for storing the hydrogen gas discharged from the compressor, a dispenser for filling a vehicle with the hydrogen gas supplied from the pressure accumulator, and the like. Since the hydrogen station described in Patent Literature 1 can be moved by a truck, even in a case where it is difficult to secure a site for installing the hydrogen station, the vehicle can be filled with the hydrogen gas.

Meanwhile, it has been proposed that the hydrogen station is installed within a site of an existing gas station (a so-called "gasoline stand" in Japanese English) and the like. However, there is a case where it is difficult to secure a sufficient installation space for installing the hydrogen station in a site where an existing facility exists. Further, when various devices of the hydrogen station are assembled on site according to the installation space within the site, a transportation cost and an assembly cost are increased. In the hydrogen station described in Patent Literature 1, since it is not assumed that the hydrogen producing device is fixed to the site, the hydrogen producing device cannot be separated from the truck. Alternatively, even if the hydrogen producing device can be separated, it is difficult to properly dispose the respective devices according to the space of the site (to dispose the devices so as to be accommodated within the site).

CITATION LIST

Patent Literature

Patent Literature 1: JP 2004-017701 A

SUMMARY OF INVENTION

An object of the present invention is to provide a hydrogen station capable of improving a degree of freedom in installation within a site.

A hydrogen station according to an aspect of the present invention includes: a filling facility for filling a tank-mounted device with a gas; and a gas supply system for supplying the gas to the filling facility. The gas supply system includes: a compressor for compressing the gas; a compressor accommodating body for accommodating the compressor; a refrigerator for cooling the gas flowed into the filling facility or the gas just before being flowed into the filling facility, the refrigerator including an evaporation part, an expansion part, and a compression part; and a cooler accommodating body for accommodating the evaporation part, the expansion part, and the compression part. The compressor accommodating body and the cooler accommodating body are detachable from each other.

DESCRIPTION OF EMBODIMENTS

Figure 1:
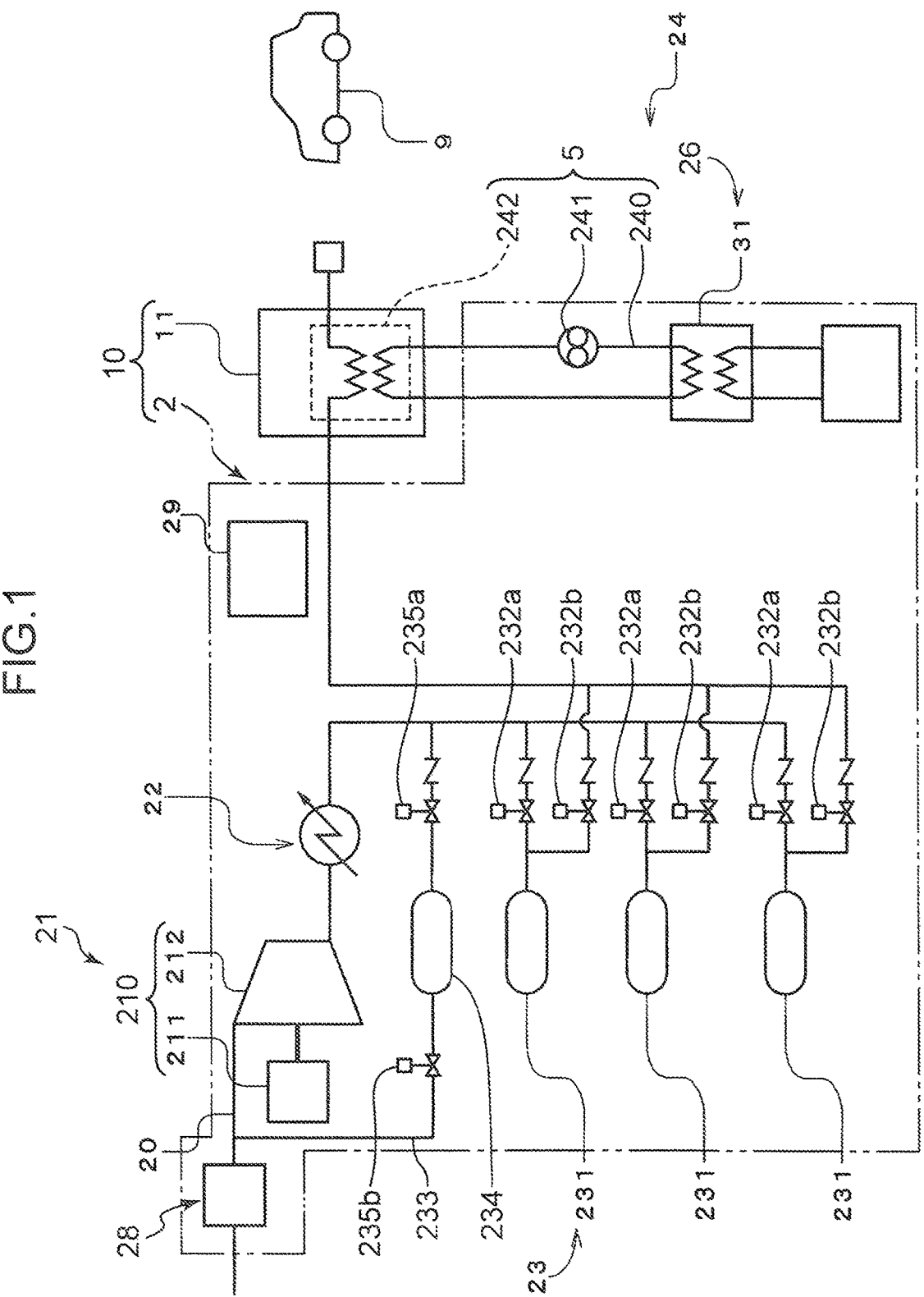
FIG. 1 is a diagram showing a hydrogen station having a gas supply system according to one embodiment of the present invention.

FIG. 1 is a diagram schematically showing a configuration of a hydrogen station 10 according to one embodiment of the present invention. The hydrogen station 10 includes a gas supply system 2 and a dispenser 11 serving as a filling facility.

The gas supply system 2 supplies a hydrogen gas to the dispenser 11. The gas supply system 2 includes a gas flow path 20, a compressor unit 21, a pressure accumulator unit 23, a cooler unit 24, a receiving unit 28, and a control part 29. The receiving unit 28, the compressor unit 21, and the pressure accumulator unit 23 are disposed on the gas flow path 20. The hydrogen gas flows toward the dispenser 11 within the gas flow path 20. The control part 29 includes a control part body and a control part frame body for accommodating the control part body, the control part frame body being described later. The control part body controls the compressor unit 21, the pressure accumulator unit 23, and the cooler unit 24. In the following description, the compressor unit 21, the pressure accumulator unit 23, the cooler unit 24, the receiving unit 28, the dispenser 11, and the control part 29 are collectively referred to as "main devices". It should be noted that the term "unit" is used as a term meaning a functional block.

The compressor unit 21 includes a reciprocating compressor 210, a compressor accommodating body for accommodating the compressor 210, the compressor accommodating body being described later, and a gas cooling part 22. It should be noted that the term "accommodating body" is used to mean a box-shaped structure for accommodating a device. The compressor 210 includes a drive part 211 and a compression part 212. The compression part 212 has a piston and a cylinder. The piston is driven by power of the drive part 211, thereby allowing the hydrogen gas to be compressed within the cylinder. In the present embodiment, the number of compression parts 212 is five.

Figure 2:
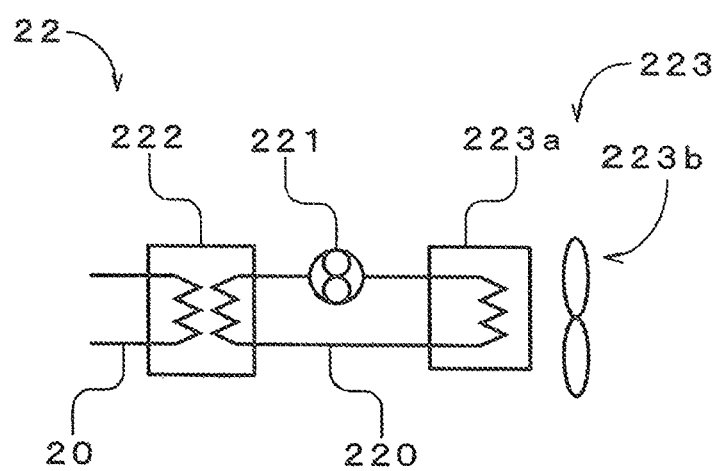
FIG. 2 is a diagram showing a gas cooling part.

FIG. 2 is a diagram showing a configuration of the gas cooling part 22. The gas cooling part 22 includes a cooling water flow path 220 filled with cooling water serving as cooling fluid, a cooling water pump 221, a gas cooler 222 connected to the compression part 212, and a heat exhausting part 223. The gas cooler 222 is a microchannel type heat exchanger. The gas flow path 20 shown in FIGS. 1 and 2 is connected to the gas cooler 222. The heat exhausting part 223 includes a heat exchanger 223a and a fan 223b. The cooling water flow path 220 is disposed with the cooling water pump 221, the gas cooler 222, and the heat exchanger 223a of the heat exhausting part 223. In the gas cooling part 22, heat is exchanged between the hydrogen gas discharged from a discharge part of the compression part 212 and the cooling water in the gas cooler 222, thereby allowing the hydrogen gas within the gas flow path 20 to be cooled. The cooling water, which has absorbed the heat in the gas cooler 222, flows into the heat exchanger 223a of the heat exhausting part 223, and is then cooled by a flow of air generated by the fan 223b. The cooling water cooled in the heat exchanger 223a is sent to the gas cooler 222 again by the cooling water pump 221.

As shown in FIG. 1, the pressure accumulator unit 23 includes a plurality of pressure accumulators 231 (three in the present embodiment), valve members 232a, 232b, and a pressure accumulator accommodating body for accommodating the valve members 232a, 232b, and the pressure accumulators 231, the pressure accumulator accommodating body being described later. The pressure accumulator 231 has a capsule shape. The hydrogen gas discharged from the compressor unit 21 is stored in the pressure accumulators 231. Further, the hydrogen gas is sent out from the pressure accumulators 231 to the dispenser 11. The pressure accumulators 231 are each designed to have the same design pressure (e.g., 82 MPa). In the pressure accumulator unit 23, the valve members 232a, 232b are provided on an inlet side and an outlet side of the pressure accumulator 231. The control part 29 controls opening/closing of the valve members 232a, 232b, thereby allowing inflow/outflow of the hydrogen gas in the pressure accumulator 231 to be controlled.

Moreover, as shown in FIG. 1, the present gas supply system 2 further includes a return flow path 233, a reservoir tank 234, and valve members 235a, 235b. The return flow path 233 is a flow path for returning the hydrogen gas discharged from the compressor 210 to an upstream side region of the compressor 210 in the gas flow path 20. The reservoir tank 234 stores the hydrogen gas discharged from the compressor 210. The valve member 235a is provided in an upstream side region than the reservoir tank 234 in the return flow path 233, and the valve member 235b is provided in a downstream side region than the reservoir tank 234 in the return flow path 233. The storage of the hydrogen gas in the reservoir tank 234, that is, opening/closing of the valve member 235a, is controlled by the control part 29.

Specifically, when the hydrogen gas discharged from the compressor 210 is supplied to the respective pressure accumulators 231, the control part 29 closes the valve members 235a, 235b and opens the valve members 232a. Then, when pressure of the respective pressure accumulators 231 becomes equal to or greater than a predetermined value (e.g., 80 MPa), the control part 29 opens the valve member 235a. In that case, since a portion of the hydrogen gas discharged from the compressor 210 is supplied to the reservoir tank 234, flow rates of the hydrogen gas supplied to the respective pressure accumulators 231 are decreased. Hence, even when the hydrogen gas is continuously supplied excessively to these pressure accumulators 231 after the pressure of the respective pressure accumulators 231 becomes equal to or greater than the predetermined value, action of an overload on the pressure accumulators 231 due to the excessive supply is prevented. It should be noted that, even if the valve member 235a is opened, since a processing amount of the compressor 210 (a discharge amount of the hydrogen gas) is sufficiently large, the hydrogen gas does not flow from the respective pressure accumulators 231 into the reservoir tank 234.

After that, when pressure of the reservoir tank 234 becomes a prescribed value (e.g., 40 MPa), the control part 29 stops the compressor 210, and closes the valve member 235a. It should be noted that the pressure of the reservoir tank 234 is detected by a pressure sensor provided in the upstream region of the reservoir tank 234 in the return flow path 233. However, before the pressure of the reservoir tank 234 becomes the prescribed value, for example, when the pressure of the reservoir tank 234 reaches a reference value lower than the prescribed value, the control part 29 may close the valve member 235a and open the valve member 235b to return the hydrogen gas within the reservoir tank 234 to the compressor 210. In this manner, since suction pressure of the hydrogen gas in the compressor 210 is secured, the processing amount of the compressor 210 is secured. Alternatively, after the pressure of the reservoir tank 234 becomes the prescribed value, it is possible that the reservoir tank 234 is removed from the return flow path 233, that the reservoir tank 234 is carried to another facility (the hydrogen station or the like) by a trailer or the like, and that the hydrogen gas within the reservoir tank 234 is used in that facility. In this case, the downstream side region than the reservoir tank 234 in the return flow path 233 and the valve member 235b may be omitted.

The cooler unit 24 includes a refrigerator 26, a brine circuit 5, and a cooler accommodating body, which is to be described later. In FIG. 1, devices of the refrigerator 26 other than an evaporation part 31 are shown in one rectangular shape. The brine circuit 5 includes a brine flow path 240, a brine pump 241, and a precool heat exchanger 242 serving as a microchannel type heat exchanger. In the present embodiment, the precool heat exchanger 242 is built in the dispenser 11. It should be noted that a brine tank (not shown) for storing brine may be provided in the brine circuit 5. The brine flow path 240 is filled with the brine, and is disposed with the brine pump 241, the precool heat exchanger 242, and the evaporation part 31 of the refrigerator 26.

In the brine circuit 5, heat is exchanged between the hydrogen gas and the brine in the precool heat exchanger 242, thereby allowing the hydrogen gas flowed into the dispenser 11 to be cooled. The brine, which has absorbed the heat in the precool heat exchanger 242, flows into the refrigerator 26 to be cooled. The brine cooled by the refrigerator 26 is sent to the precool heat exchanger 242 again by the brine pump 241.

Figure 3:
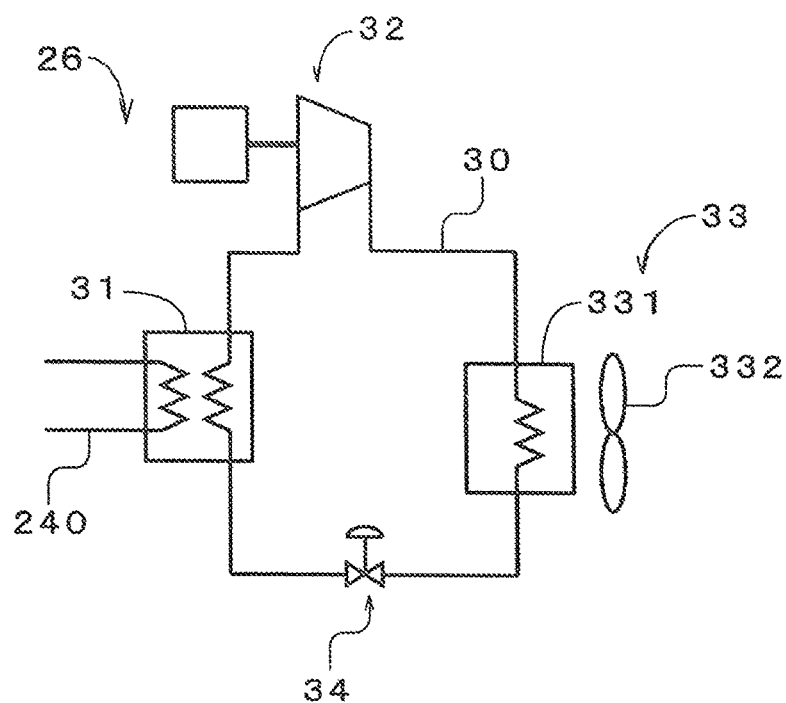
FIG. 3 is a diagram showing a refrigerator.

FIG. 3 is a diagram showing a configuration of the refrigerator 26. The refrigerator 26 includes a refrigerant flow path 30, the evaporation part 31, a compression part 32, a condensation part 33, and an expansion part 34. The refrigerant flow path 30 is filled with a refrigerant, and is disposed with the evaporation part 31, the compression part 32, the condensation part 33, and the expansion part 34. The evaporation part 31 is connected to the brine flow path 240 shown in FIGS. 1 and 3. In the evaporation part 31, heat is exchanged between the brine and the refrigerant, thereby allowing the brine to be cooled and the refrigerant to be evaporated. The compression part 32 shown in FIG. 3 compresses the refrigerant flowed out from the evaporation part 31. The condensation part 33 includes a heat exchanger 331, into which the refrigerant flows, and a fan 332. The refrigerant flowed from the compression part 32 to the heat exchanger 331 is subjected to heat dissipation by a flow of air generated by the fan 332 to be condensed. The expansion part 34 expands the refrigerant flowed out from the condensation part 33, and the expanded refrigerant flows into the evaporation part 31. The refrigerator 26 can indirectly cool the hydrogen gas flowed into the dispenser 11 by cooling the brine by a so-called heat pump cycle.

The receiving unit 28 shown in FIG. 1 includes a pressure reducing valve or various instrumentation devices (not shown) and receives the hydrogen gas supplied from outside. The pressure reducing valve is a valve for reducing pressure of the hydrogen gas so that the hydrogen gas is received by the compression part 212 through the gas flow path 20, and is disposed on an inlet side of the compression part 212 in the gas flow path 20.

The dispenser 11 fills a vehicle 9 serving as a tank-mounted device with the hydrogen gas sent out from the pressure accumulator 231. The vehicle 9 is, for example, a fuel cell vehicle.

When the vehicle 9 is filled with the hydrogen gas, the hydrogen gas sent from the receiving unit 28 is compressed by the compressor 210. The hydrogen gas is then stored in the respective pressure accumulators 231 while being cooled in the gas cooling part 22.

Then, when the vehicle 9 is carried into the hydrogen station 10, the hydrogen gas is supplied from the respective pressure accumulators 231 to the dispenser 11, and the dispenser 11 and the control part 29 fill the vehicle 9 with the hydrogen gas according to a predetermined filling protocol. At this time, in the pressure accumulator unit 23, the hydrogen gas is first sent out from the first pressure accumulator 231 (e.g., the pressure accumulator 231 on a top side in FIG. 1). In the following description, the pressure accumulator is indicated by a reference sign "231a" in a case where the pressure accumulator is distinguished from the other pressure accumulators. The dispenser 11 indirectly measures pressure within the vehicle 9. When the dispenser 11 determines that a pressure difference between the vehicle 9 and the pressure accumulator 231a is equal to or less than a predetermined value, the dispenser 11 sends an instruction to the control part 29 of the gas supply system 2 to stop sending-out of the hydrogen gas from the pressure accumulator 231a.

Subsequently, the control part 29 of the gas supply system 2 opens the other pressure accumulator 231 (e.g., the second pressure accumulator 231 from the top in FIG. 1) and sends out the hydrogen gas to the dispenser 11. Hereinafter, the second pressure accumulator is indicated by a reference sign "231b" in a case where the pressure accumulator is distinguished from the other pressure accumulators. With this configuration, a pressure difference between the dispenser 11 (or the pressure accumulator 231b) and the vehicle 9 is restored, and a flow rate of the hydrogen gas filling the vehicle 9 is secured. When the pressure of the tank within the vehicle 9 rises, and the dispenser 11 determines that the pressure difference between the pressure accumulator 231b and the vehicle 9 is equal to or less than the predetermined value, the control part 29 of the gas supply system 2 stops sending-out of the hydrogen gas from the pressure accumulator 231b. Further, the control part 29 opens the other pressure accumulator (the pressure accumulator located on a bottom side in FIG. 1), thereby allowing the hydrogen gas to be sent out. With this configuration, the pressure difference between the dispenser 11 and the vehicle 9 is secured, and the vehicle 9 is filled with a sufficient amount of hydrogen gas. When it is determined that the pressure of the tank within the vehicle 9 becomes a set value, supply of the hydrogen gas from the gas supply system 2 is stopped.

As described above, in the pressure accumulator unit 23, one of the three pressure accumulators 231 is used in a low pressure region (e.g., 0 MPa to 40 MPa) of the tank of the vehicle 9, another thereof is used in a medium pressure region (e.g., 40 MPa to 60 MPa), and further another thereof is used in a high pressure region (e.g., 60 MPa to 70 MPa). Since the gas supply system 2 switches the pressure accumulators 231 according to the three pressure regions of the vehicle 9, the dispenser 11 can efficiently fill the vehicle 9 with the hydrogen gas according to the filling protocol.

Figure 4:
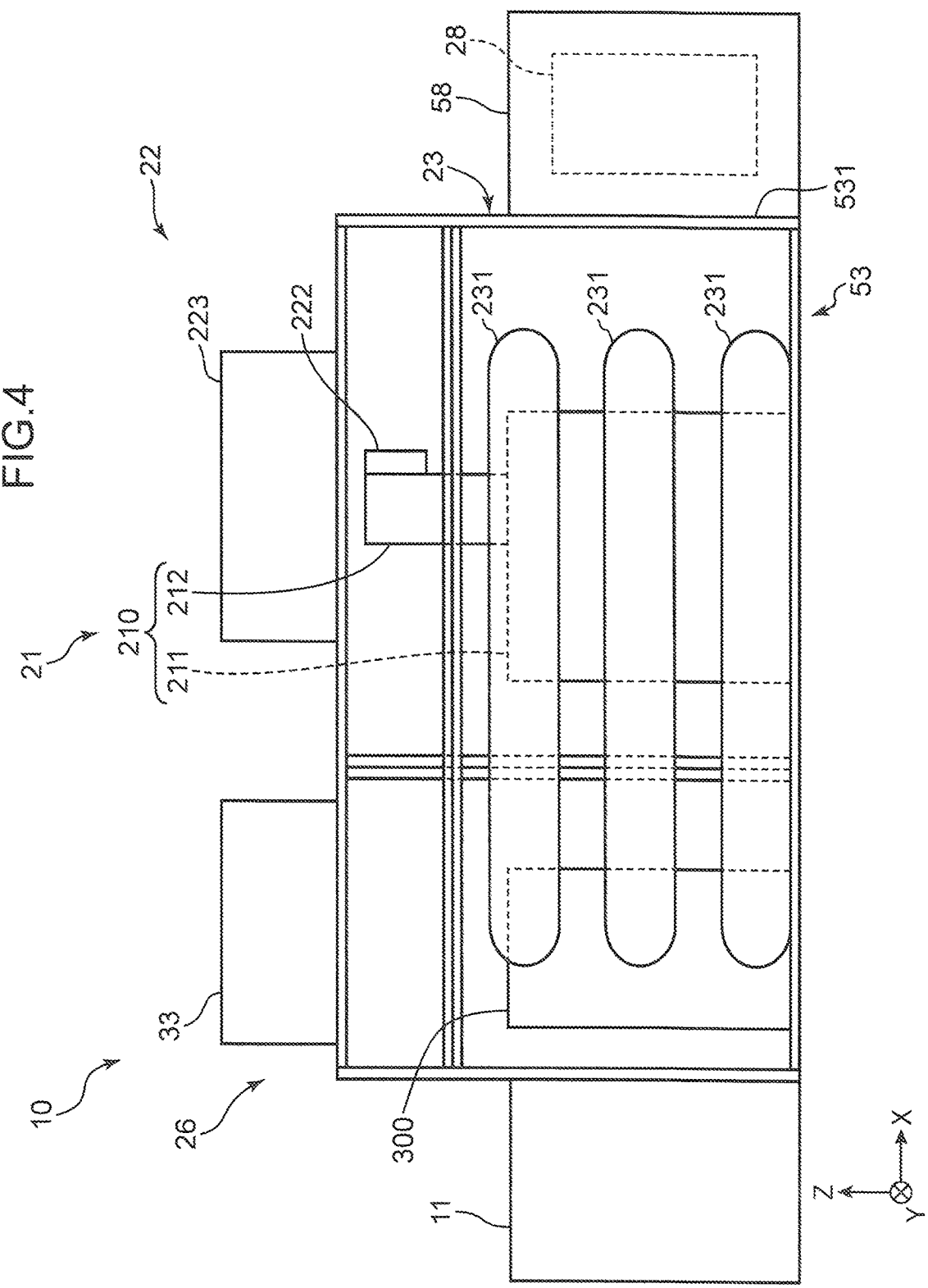
FIG. 4 is a side view of the hydrogen station shown in FIG. 1.
Figure 5:
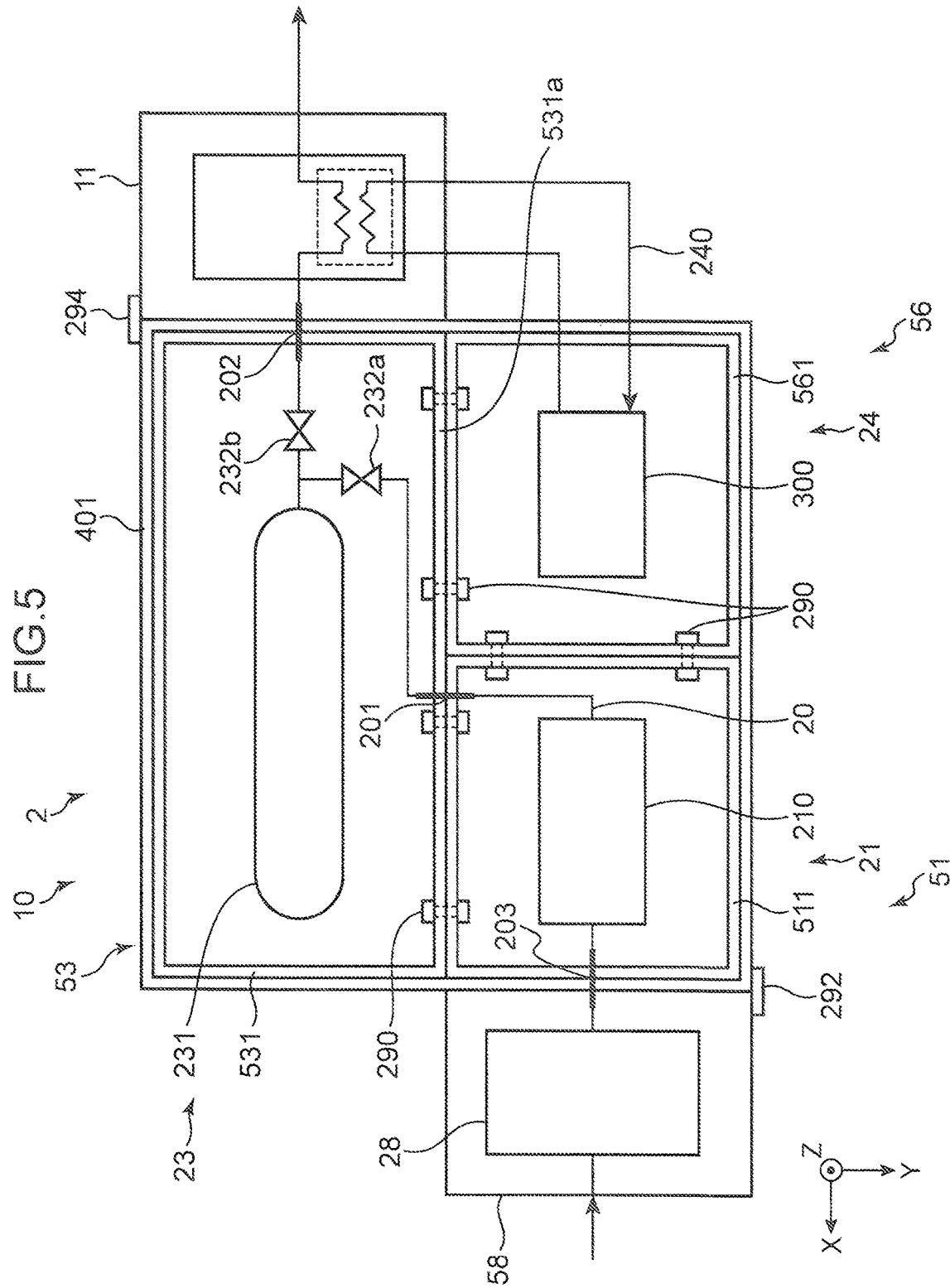
FIG. 5 is a plan view showing the hydrogen station.

FIG. 4 is a side view of the hydrogen station 10 and shows a state in which the respective main devices are integrated. It should be noted that FIG. 4 shows the hydrogen station 10 in a state in which a common cover, which will be described below, is removed. FIG. 5 is a plan view of the hydrogen station 10 and corresponds to FIG. 4. It should be noted that only the main devices of the hydrogen station 10 are shown in FIGS. 4 and 5 and illustration of peripheral members is omitted therein. The same is true of the following FIG. 6.

As shown in FIG. 5, the compressor unit 21 has a substantially rectangular parallelepiped compressor accommodating body 51 for accommodating the compressor 210 and the gas cooler 222 which is shown in FIGS. 2 and 4 (not shown in FIG. 5). The compressor accommodating body 51 includes a compressor frame body 511 serving as a framework. Similarly, the pressure accumulator unit 23 includes a substantially rectangular parallelepiped pressure accumulator accommodating body 53 for accommodating the pressure accumulator 231 and the valve members 232a, 232b. The pressure accumulator accommodating body 53 includes a pressure accumulator frame body 531. The cooler unit 24 includes a substantially rectangular parallelepiped cooler accommodating body 56 for accommodating the evaporation part 31, the compression part 32, and the expansion part 34 which are shown in FIG. 3, the brine pump 241 shown in FIG. 1, and the brine tank (not shown). In other words, the cooler accommodating body 56 accommodates devices other than the precool heat exchanger 242 and the condensation part 33 of the devices included in the cooler unit 24. In FIGS. 4 and 5, the evaporation part 31, the compression part 32, the expansion part 34, the brine pump 241, and the brine tank are shown in one rectangular shape indicated by the reference sign 300. The same is true of the following FIGS. 6 to 8.

The cooler accommodating body 56 includes a cooler frame body 561. The gas supply system 2 has one common cover 401 for covering the whole of the compressor frame body 511, the pressure accumulator frame body 531, and the cooler frame body 561. It should be noted that, of the common cover 401, a region covering the compressor frame body 511, a region covering the pressure accumulator frame body 531, and a region covering the cooler frame body 561 respectively configure a portion of the compressor accommodating body 51, a portion of the pressure accumulator accommodating body 53, and a portion of the cooler accommodating body 56. In FIG. 5, illustration of an upper part of the common cover 401 is omitted for convenience of illustration. In reality, upper parts of the respective frame bodies 511, 531, 561 are also covered with the common cover 401.

The compressor frame body 511 includes at least four pillar parts extending in a gravity direction and a plurality of coupling parts for connecting the pillar parts. A substantially rectangular parallelepiped space is defined around the compressor 210 by the compressor frame body 511.

As shown in FIGS. 4 and 5, the pressure accumulator frame body 531 includes at least four pillar parts extending in the gravity direction and a plurality of coupling parts for connecting the pillar parts, as with the compressor frame body 511. A substantially rectangular parallelepiped space is defined around the pressure accumulator 231 by the pressure accumulator frame body 531. Inside the pressure accumulator accommodating body 53, the three pressure accumulators 231 are each parallel to a horizontal plane, and are disposed so as to overlap with each other in the gravity direction (in a state of being aligned along the gravity direction), which is a Z direction. Hereinafter, an X direction in FIGS. 4 and 5 serving as a direction in which the pressure accumulator 231 extends is referred to as a "longitudinal direction" of the hydrogen station 10. As shown in FIG. 4, in the present embodiment, the heat exhausting part 223 of the gas cooling part 22 and the condensation part 33 of the refrigerator 26 are disposed on an upper part of the pressure accumulator frame body 531. However, the heat exhausting part 223 and the condensation part 33 may be disposed on another place, such as a side part of the pressure accumulator frame body 531. It should be noted that illustration of the heat exhausting part 223 and the condensation part 33 is omitted in FIGS. 5 and 6.

As shown in FIG. 5, the cooler frame body 561 includes at least four pillar parts extending in the gravity direction and a plurality of coupling parts for connecting the pillar parts, as with the compressor frame body 511. A substantially rectangular parallelepiped space is defined around the device indicated by the reference sign 300 in FIG. 5 (the evaporation part 31, the compression part 32, and the expansion part 34 which are shown in FIG. 3, and the brine pump 241 and the brine tank of the brine circuit 5 which are shown in FIG. 1) by the cooler frame body 561. A substantially rectangular parallelepiped control part frame body, in which the control part body of the control part 29 (see FIG. 1) is accommodated, is provided on a lower side of the cooler frame body 561 in the gravity direction.

The compressor frame body 511 and the cooler frame body 561 are aligned along a side part 531a, on a (+Y) side in FIG. 5, of two side parts of the pressure accumulator unit 23, the side parts being parallel to the longitudinal direction. The compressor frame body 511 and the cooler frame body 561 are detachably connected to each other by fixtures 290, which are bolts, in a state of being positioned by positioning pins or the like. In the gas supply system 2, the sum of lengths of the compressor frame body 511 and the cooler frame body 561 is substantially the same as a length of the pressure accumulator frame body 531 in the longitudinal direction, that is, a direction along the one side part 531a of the pressure accumulator accommodating body 53.

The compressor frame body 511 and the pressure accumulator frame body 531 are aligned along a width direction (a Y direction in FIGS. 4, 5) orthogonal to the longitudinal direction in the horizontal plane. The compressor frame body 511 and the pressure accumulator frame body 531 are detachably connected to each other by the fixtures 290 in a positioned state. Further, the cooler frame body 561 and the pressure accumulator frame body 531 are aligned along the width direction. The cooler frame body 561 and the pressure accumulator frame body 531 are detachably connected to each other by the fixtures 290.

In the width direction, that is, a direction within the horizontal plane and vertical to the one side part 531a of the pressure accumulator accommodating body 53, the sum of lengths of the cooler frame body 561 and the pressure accumulator frame body 531 is substantially the same as the sum of lengths of the compressor frame body 511 and the pressure accumulator frame body 531.

Further, the above-described control part frame body provided on the lower side of the cooler frame body 561 is detachably connected to the cooler frame body 561, the pressure accumulator frame body 531, and the compressor frame body 511. In the gravity direction, a height of the pressure accumulator frame body 531 shown in FIG. 4 is substantially the same as the sum of a height of the compressor frame body 511 and heights of the cooler frame body 561 and the control part frame body located on the lower side of the cooler frame body 561, all of which are shown in FIG. 5. As described above, the gas supply system 2 has a substantially rectangular parallelepiped shape obtained by integrating the compressor unit 21, the pressure accumulator unit 23, the cooler unit 24, and the control part 29 (see FIG. 1).

As shown in FIGS. 4 and 5, the receiving unit 28 is accommodated in a substantially rectangular parallelepiped receiving unit accommodating body 58. As shown in FIG. 5, the receiving unit accommodating body 58 is detachably connected by a fixing member 292 to a region on a side opposite to a side, on which the cooler unit 24 is disposed, of the compressor unit 21 in the longitudinal direction using the compressor unit 21 as a reference, that is, the region on a (+X) side.

As shown in FIGS. 4 and 5, the dispenser 11 has a substantially rectangular parallelepiped shape. The dispenser 11 is detachably connected by a fixing member 294 to a side part, closer to the cooler unit 24, of the two side parts of the pressure accumulator unit 23, the side parts being parallel to each other in the width direction, that is, the side part on a (−X) side.

As shown in FIG. 5, in the hydrogen station 10, piping having flexibility (hereinafter referred to as "flexible piping") is used for a region 201 located on a boundary between the compressor frame body 511 and the pressure accumulator frame body 531 of the gas flow path 20, a region 202 located on a boundary between the pressure accumulator unit 23 and the dispenser 11 thereof, and a region 203 located on a boundary between the receiving unit accommodating body 58 and the compressor unit 21 thereof. In the gas flow path 20, even when the other piping located on both sides of the flexible piping is displaced from a predetermined position due to position aberration of each main device of the hydrogen station 10, the position aberration is absorbed by bending of the flexible piping. Further, thermal stress occurring when the hydrogen gas flows in the gas flow path 20 is also absorbed by the flexible piping.

When the hydrogen station 10 is installed in a site, the compressor unit 21, the pressure accumulator unit 23, the cooler unit 24, the receiving unit 28, the dispenser 11, and the control part 29 are individually assembled in advance in a factory. Then, these main devices are shipped by a truck or the like and assembled with each other within the site for installing the hydrogen station 10. Accordingly, the state shown in FIG. 5 is formed.

By integrating the respective accommodating bodies for accommodating the respective main devices of the hydrogen station 10, an installation area of the hydrogen station 10 can be reduced. Further, the compressor accommodating body 51 and the cooler accommodating body 56 are aligned along the one side part 531a of the pressure accumulator accommodating body 53. In other words, the compressor unit 21 and the cooler unit 24 are connected to the pressure accumulator unit 23 so as not to overlap with the pressure accumulator 231 in the longitudinal direction. With this configuration, maintenance or the like of the pressure accumulator unit 23 can be easily performed.

Incidentally, a space capable of installing the hydrogen station 10 is different in each site, and there is a case where it is difficult to install the hydrogen station 10 within the site in the state shown in FIG. 5. Accordingly, a shape of the hydrogen station 10 can be changed according to the installation space within the site.

Figure 6:
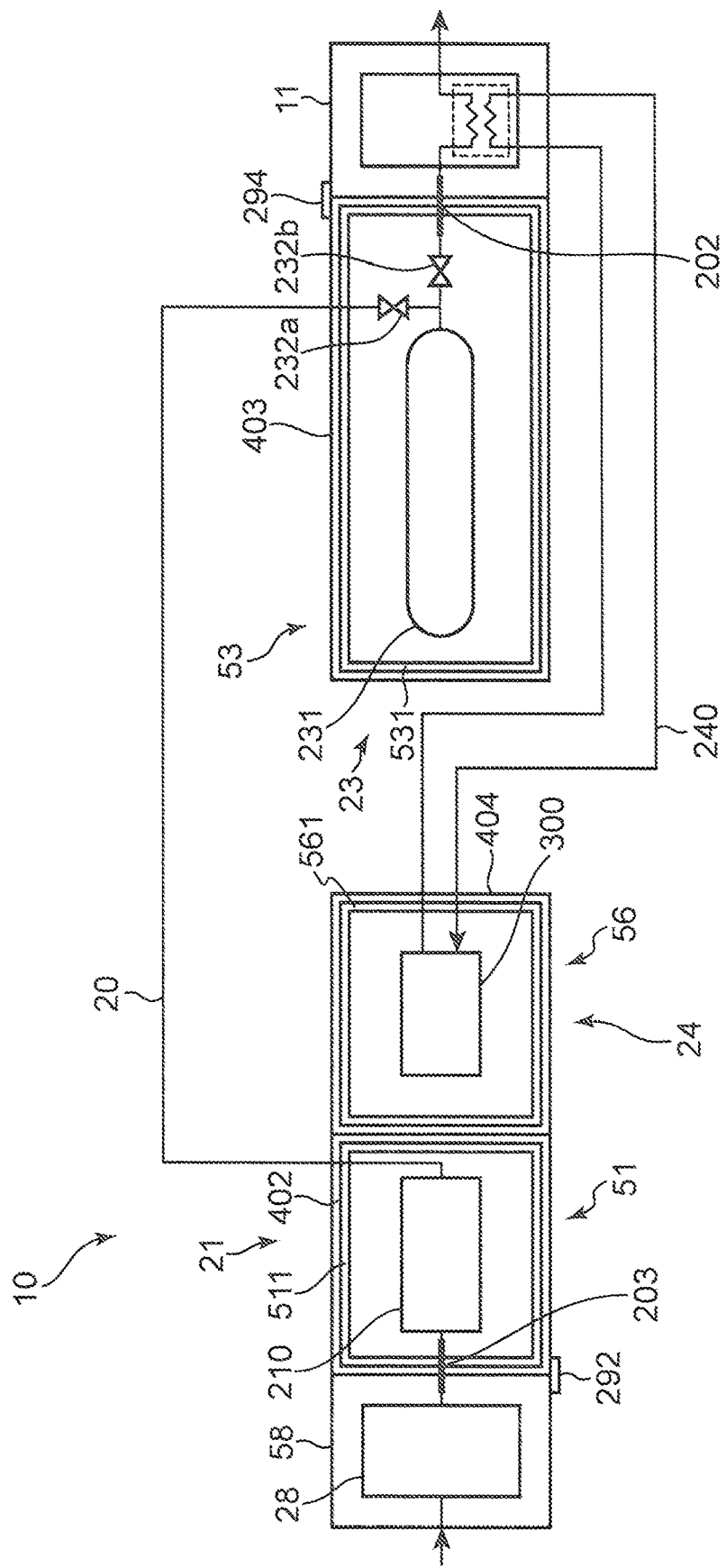
FIG. 6 is a plan view showing another shape of the hydrogen station.

FIG. 6 is a diagram illustrating a configuration of a modified hydrogen station 10. A first assembly is formed by integrating the compressor accommodating body 51, the cooler accommodating body 56, and the receiving unit accommodating body 58. A second assembly different from the first assembly is formed by integrating the pressure accumulator accommodating body 53 and the dispenser 11. The first assembly and the second assembly are disposed separately from each other. The compressor frame body 511, the pressure accumulator frame body 531, and the cooler frame body 561 are respectively provided with individual covers 402, 403, 404. In other words, the compressor accommodating body 51 is formed with the compressor frame body 511 and the individual cover 402. The pressure accumulator accommodating body 53 is formed with the pressure accumulator frame body 531 and the individual cover 403. The cooler accommodating body 56 is formed with the cooler frame body 561 and the individual cover 404. In FIG. 6, illustration of upper parts of the individual covers 402 to 404 is omitted for convenience of illustration. However, upper parts of the respective frame bodies 511, 531, 561 are also covered with the individual covers 402 to 404. Flexible piping is used for a region 203 located on a boundary between the compressor unit 21 and the receiving unit 28 of the gas flow path 20, and a region 202 located on a boundary between the dispenser 11 and the pressure accumulator unit 23 thereof.

Since the hydrogen station 10 can be separated into the first assembly and the second assembly, it is possible to install the hydrogen station 10 even in a site where it is difficult to install the hydrogen station 10 in a state in which the whole main devices are integrated. Further, the number of devices installed around the dispenser 11 where there are many comings and goings of vehicles or people can be reduced.

The hydrogen station 10 having the gas supply system 2 according to the one embodiment of the present invention has been described above. In the hydrogen station 10, the compressor accommodating body 51, the pressure accumulator accommodating body 53, the cooler accommodating body 56, the receiving unit accommodating body 58, the dispenser 11, and the control part 29 are detachable from each other. With this configuration, the compressor unit 21, the pressure accumulator unit 23, the cooler unit 24, the receiving unit 28, the dispenser 11, and the control part 29 can be handled independently of each other. In other words, these main devices are unitized and handled independently of each other based on role divisions of the devices in a process of supplying the hydrogen gas to the dispenser 11. Therefore, the shape of the hydrogen station 10 can be variously changed, and a degree of freedom in installation of the hydrogen station 10 within the site can be secured.

Since the main devices are unitized and accommodated in the accommodating bodies for each unit, transportation on a device-by-device basis becomes possible. Also, a load and a cost of the transportation work are reduced as compared with a case where the hydrogen station 10 is transported in a completed state. Further, since the main devices are unitized in the factory and shipped, an assembly cost is reduced as compared with a case where the respective main devices are assembled within the site. However, in a case where it is determined in advance that the main devices are used in the integrated state as shown in FIG. 5, the assembled hydrogen station 10 may be transported to the site. In this case, vibration generated in the gas flow path 20 during the transportation of the hydrogen station 10 is absorbed by utilizing the flexible piping.

A size of the gas supply system 2 can be suppressed by integrating the receiving unit accommodating body 58 and the compressor accommodating body 51. Further, a size of the hydrogen station 10 can be suppressed by integrating the dispenser 11 and the pressure accumulator accommodating body 53. The plurality of pressure accumulators 231 are disposed so as to overlap with each other in the gravity direction, thereby suppressing an increase in the installation space of the gas supply system 2 in a horizontal direction.

The embodiment of the present invention has been described above. However, the present invention is not limited to the above-described embodiment, and various changes are possible.

Figure 7:
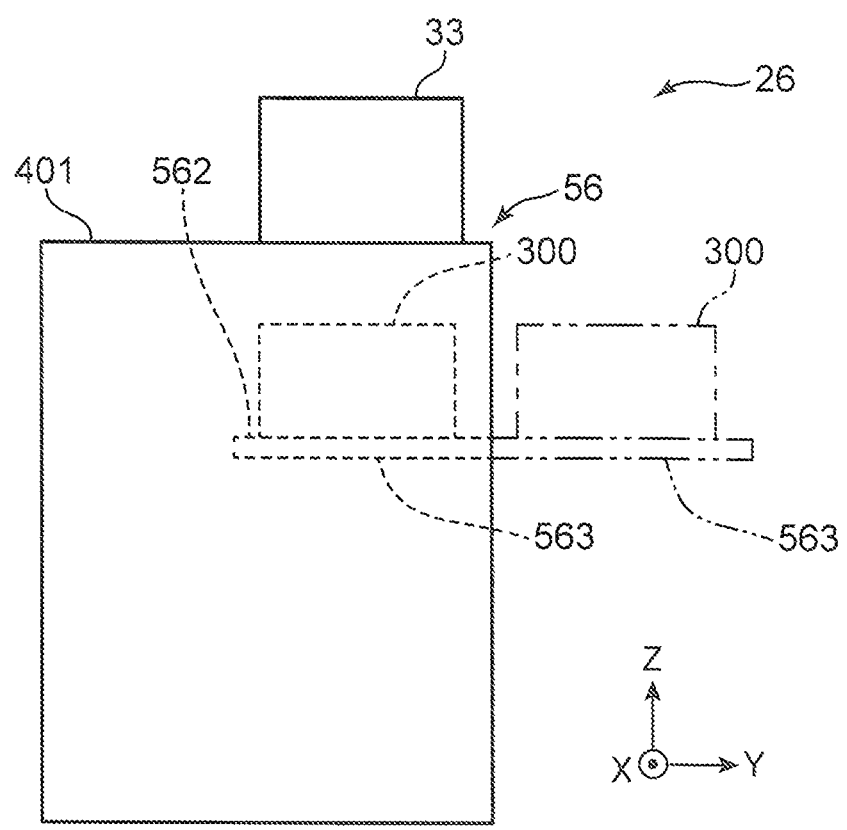
FIG. 7 is a side view of a variation of the hydrogen station shown in FIG. 1.
Figure 8:
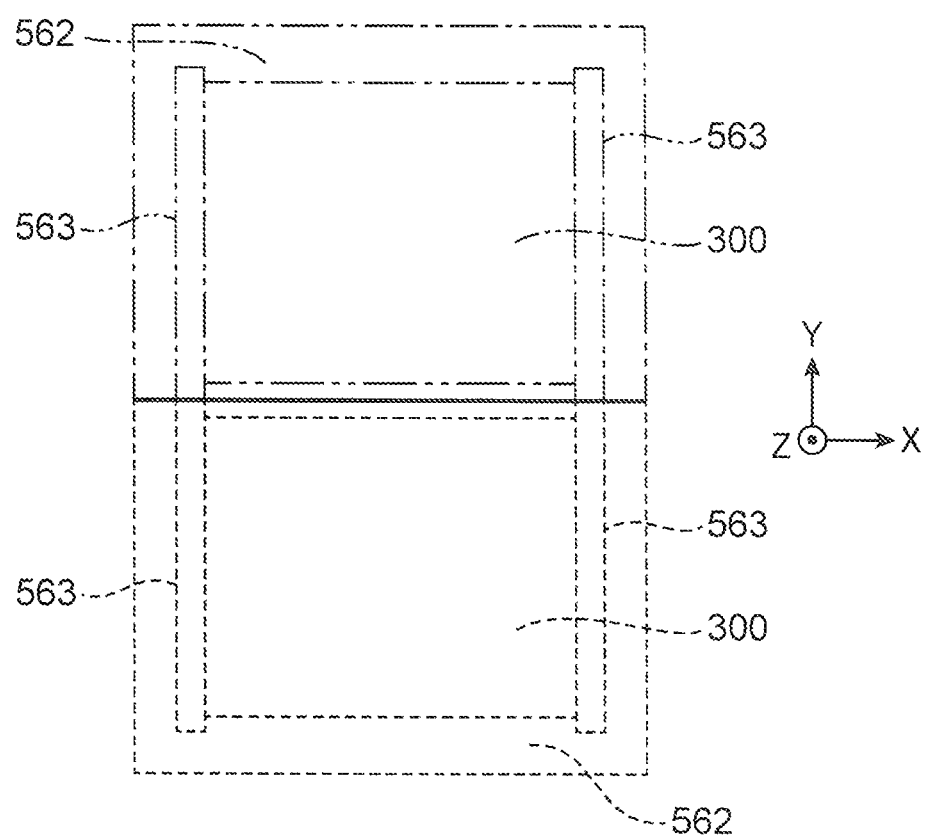
FIG. 8 is a plan view of a device indicated by a reference sign 300, a mounting part, and a pair of guide parts.

For example, as shown in FIGS. 7 and 8, the cooler accommodating body 56 may further include a mounting part 562 and a pair of guide parts 563. The mounting part 562 is a member for mounting the device indicated by the reference sign 300, that is, the evaporation part 31, the compression part 32, the expansion part 34, the brine pump 241, and the brine tank. The mounting part 562 is formed in a plate shape capable of supporting the above device from below. The mounting part 562 is disposed at a position separated upward from a bottom part of the cooler frame body 561. However, the mounting part 562 may be disposed at a position where the above device is supported by the bottom part of the cooler frame body 561 (a position shown in FIG. 4). The pair of guide parts 563 is configured so that the mounting part 562 can be displaced relative to the cooler frame body 561 along a width direction (a Y direction) between an accommodation position where the mounting part 562 is located within the cooler frame body 561 (a position shown by a broken line in FIGS. 7 and 8) and an exposure position where the mounting part 562 is located outside the cooler frame body 561 (a position shown by a two-dot chain line in FIGS. 7 and 8). For example, each guide part 563 has a first guide rail fixed to the cooler frame body 561 and a second guide rail fixed to the mounting part 562. The second guide rail is provided at an end part of the mounting part 562 in a width direction (an X direction) and can be displaced along the first guide rail. In this case, it is preferable that the brine flow path 240 be formed of extensible expansion piping. Further, it is preferable that, of the refrigerant flow path 30, at least a region between the compression part 32 and the heat exchanger 331 and a region between the heat exchanger 331 and the expansion part 34 be also formed of the above expansion piping. The respective expansion piping extends so as to allow displacement of the mounting part 562 from the above accommodation position to the above exposure position. In this way, the mounting part 562 can be located at the above exposure position through a window formed at a cover disposed around the cooler frame body 561 without dividing the brine flow path 240 and the refrigerant flow path 30. Meanwhile, a shutoff valve may be provided in the brine flow path 240. By closing this shutoff valve, the brine flow path 240 is divided in a state in which outflow of the brine from the brine flow path 240 is prevented, and then the mounting part 562 is drawn out to the above exposure position. The same is true of the refrigerant flow path 30 side.

Further, the precool heat exchanger 242 may be provided outside the dispenser 11. In this case, the precool heat exchanger 242 may be accommodated within the cooler accommodating body 56. In the cooler unit 24, the brine pump 241 and the brine tank may be disposed outside the cooler accommodating body 56 as long as the expansion part 34, the compression part 32, and the evaporation part 31 are at least accommodated in the cooler accommodating body 56. Further, an accommodating body for accommodating the respective devices of the brine circuit 5 may be provided apart from the cooler accommodating body 56. The accommodating body may be connected to the compressor unit 21, the pressure accumulator unit 23, and the dispenser 11 independently of the cooler accommodating body 56. The cooler unit 24 may cool the hydrogen gas just before being flowed into the dispenser 11.

In the above embodiment, configurations of the compressor unit 21, the pressure accumulator unit 23, and the cooler unit 24 of the main devices are especially large. Since the compressor accommodating body 51, the pressure accumulator accommodating body 53, and the cooler accommodating body 56 are detachable from each other, the degree of freedom in installation of the gas supply system 2 inside the site can be improved.

In the above embodiment, the number of pressure accumulators may be a number other than three. In the gas cooling part 22, a fluid other than water may be used as the cooling fluid for cooling the hydrogen gas. The compressor frame body 511, the cooler frame body 561, the pressure accumulator frame body 531, and the control part frame body may be detachably connected to each other by using a fastening member, such as a binding member, other than the fixture 290.

The gas supply system 2 may be utilized for filling a tank-mounted device other than the vehicle with the hydrogen gas. The gas supply system 2 may be used for supplying gas other than the hydrogen gas.

Further, the cooler unit 24 may be configured only with the refrigerator 26 (that is, without the brine circuit 5).

Further, the dispenser 11 may be disposed separately from the respective units 21, 23, 24.

Further, the respective pressure accumulators 231 may be disposed separately from each other.

Further, a hydrogen generating device for generating a high pressure hydrogen gas by electrolysis or the like may be used instead of the compressor 210.

An outline of the above embodiment is given herein.

A hydrogen station of the present embodiment includes: a filling facility for filling a tank-mounted device with a gas; and a gas supply system for supplying the gas to the filling facility. The gas supply system includes: a compressor for compressing the gas; a compressor accommodating body for accommodating the compressor; a refrigerator for cooling the gas flowed into the filling facility or the gas just before being flowed into the filling facility, the refrigerator including an evaporation part, an expansion part, and a compression part; and a cooler accommodating body for accommodating the evaporation part, the expansion part, and the compression part. The compressor accommodating body and the cooler accommodating body are detachable from each other.

According to the present hydrogen station, a degree of freedom in installation of the gas supply system within a site is improved.

In this case, it is preferable that the gas supply system further include: a plurality of pressure accumulators for each storing the gas discharged from the compressor and sending out the gas to the filling facility; and a pressure accumulator accommodating body for accommodating the plurality of pressure accumulators, and that the compressor accommodating body, the pressure accumulator accommodating body, and the cooler accommodating body be detachable from each other.

In this way, a degree of freedom in installation of the hydrogen station including the pressure accumulator accommodating body is improved.

Specifically, it is preferable that the compressor accommodating body, the pressure accumulator accommodating body, and the cooler accommodating body be integrated, and that the compressor accommodating body and the cooler accommodating body be disposed so as to align along one side part of the pressure accumulator accommodating body.

In this aspect, an installation area of the hydrogen station can be reduced.

Further, in the present hydrogen station, it is preferable that the gas supply system further include: a receiving unit for receiving the gas from outside while reducing pressure of the gas sucked into the compressor; and a receiving unit accommodating body for accommodating the receiving unit, and that the compressor accommodating body and the receiving unit accommodating body be detachable from each other.

In this way, the compressor accommodating body and the receiving unit accommodating body are integrated, thereby suppressing a size of the hydrogen station.

Further, in the present hydrogen station, it is preferable that the plurality of pressure accumulators be disposed so as to overlap with each other in a gravity direction.

In this way, an increase in size of an installation space in a horizontal direction is prevented.

Further, in the present hydrogen station, it is preferable that the gas supply system further include: a reservoir tank connected parallel to the respective pressure accumulators and for storing the gas discharged from the compressor; and a control part for controlling supply of the gas from the compressor to the respective pressure accumulators and the reservoir tank, and that when pressure of the respective pressure accumulators is equal to or greater than a predetermined value, the control part causes the gas to be supplied from the compressor to the reservoir tank.

In this aspect, when the pressure of the respective pressure accumulators is a predetermined value (for example, a value in which the pressure accumulator is almost filled with the gas), the gas is stored in the reservoir tank. Accordingly, excessive storage of the gas in the respective pressure accumulators, that is, action of an excessive load on the respective pressure accumulators, is suppressed.

Further, in the present hydrogen station, it is preferable that the cooler accommodating body be configured to be capable of exposing the evaporation part, the expansion part, and the compression part to outside of the cooler accommodating body.

In this way, maintenance of the evaporation part, the expansion part, and the compression part is facilitated.

Further, in the present hydrogen station, it is preferable that the filling facility and the pressure accumulator accommodating body be detachable from each other.

In this way, the size of the hydrogen station can be suppressed.

In this case, it is preferable that a first assembly be formed by integrating the compressor accommodating body and the cooler accommodating body, that a second assembly be formed by integrating the pressure accumulator accommodating body and the filling facility, and that the first assembly and the second assembly be disposed separately from each other.

Only the pressure accumulator accommodating body for directly sending out the gas to the filling facility is connected to the filling facility, and the other devices are formed separately from the filling facility. Accordingly, the number of devices installed in a region around the filling facility where there are comings and goings of tank-mounted devices or people can be reduced.

The invention claimed is:

1. A hydrogen station comprising:
a filling facility for filling a tank-mounted device with a gas; and
a gas supply system for supplying the gas to the filling facility,
wherein the gas supply system includes:
a compressor for compressing the gas;
a compressor accommodating body for accommodating the compressor;
a refrigerator for cooling the gas flowed into the filling facility or the gas just before being flowed into the filling facility, the refrigerator including an evaporation part, an expansion part, and a compression part; and
a cooler accommodating body for accommodating the evaporation part, the expansion part, and the compression part, and
the compressor accommodating body and the cooler accommodating body are configured to be detachable, such that positions of the compressor accommodating body and the cooler accommodating body can be individually rearranged to thereby change an operational shape of the hydrogen station.

2. The hydrogen station according to claim 1, wherein the gas supply system further includes:
a plurality of pressure accumulators for each storing the gas discharged from the compressor and sending out the gas to the filling facility; and
a pressure accumulator accommodating body for accommodating the plurality of pressure accumulators, and
the compressor accommodating body, the pressure accumulator accommodating body, and the cooler accommodating body are detachable from each other.

3. The hydrogen station according to claim 2, wherein the compressor accommodating body, the pressure accumulator accommodating body, and the cooler accommodating body are integrated, and
the compressor accommodating body and the cooler accommodating body are disposed so as to align along one side part of the pressure accumulator accommodating body.

4. The hydrogen station according to claim 1, wherein the gas supply system further includes:
a receiving unit for receiving the gas from outside while reducing pressure of the gas sucked into the compressor; and
a receiving unit accommodating body for accommodating the receiving unit, and
the compressor accommodating body and the receiving unit accommodating body are detachable from each other.

5. The hydrogen station according to claim 2, wherein the plurality of pressure accumulators are disposed so as to overlap with each other in a gravity direction.

6. The hydrogen station according to claim 2, wherein the gas supply system further includes:
a reservoir tank connected parallel to the respective pressure accumulators and for storing the gas discharged from the compressor; and
a control part for controlling supply of the gas from the compressor to the respective pressure accumulators and the reservoir tank, and
when pressure of the respective pressure accumulators is equal to or greater than a predetermined value, the control part causes the gas to be supplied from the compressor to the reservoir tank.

7. The hydrogen station according to claim 1, wherein the cooler accommodating body is configured to be capable of exposing the evaporation part, the expansion part, and the compression part to outside of the cooler accommodating body.

8. The hydrogen station according to claim 1, wherein the filling facility and a pressure accumulator accommodating body are detachable from each other.

9. A hydrogen station comprising:
a filling facility for filling a tank-mounted device with a gas; and
a gas supply system for supplying the gas to the filling facility, wherein
the gas supply system includes:
a compressor for compressing the gas;
a compressor accommodating body for accommodating the compressor;
a refrigerator for cooling the gas flowed into the filling facility or the gas just before being flowed into the filling facility, the refrigerator including an evaporation part, an expansion part, and a compression part; and
a cooler accommodating body for accommodating the evaporation part, the expansion part, and the compression part,
the compressor accommodating body and the cooler accommodating body are detachable from each other,
the filling facility and a pressure accumulator accommodating body are detachable from each other,
a first assembly is formed by integrating the compressor accommodating body and the cooler accommodating body,
a second assembly is formed by integrating the pressure accumulator accommodating body and the filling facility, and
the first assembly and the second assembly are disposed separately from each other.

10. The hydrogen station according to claim 1, further comprising a fixture member which, in an attachment condition, attaches the compressor accommodating body and the cooler accommodating body, and, in a detachment condition, allows the compressor accommodating body and the cooler accommodating body to be separated from one another.

* * * * *